(12) United States Patent
Dufault

(10) Patent No.: US 10,749,426 B1
(45) Date of Patent: Aug. 18, 2020

(54) TRAPEZOIDAL POWER-SUPPLY BARRIER BETWEEN HAZARDOUS AND NORMAL LOCATIONS

(71) Applicant: Graco Minnesota Inc., Minneapolis, MN (US)

(72) Inventor: Peter Dufault, Arden Hills, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 16/381,964

(22) Filed: Apr. 11, 2019

(51) Int. Cl.
- *H02M 1/32* (2007.01)
- *H02M 3/156* (2006.01)
- *H02M 1/00* (2006.01)

(52) U.S. Cl.
CPC .............. *H02M 1/32* (2013.01); *H02M 3/156* (2013.01); *H02M 2001/0038* (2013.01)

(58) Field of Classification Search
CPC . H02M 1/32; H02M 3/156; H02M 2001/0038
See application file for complete search history.

(56) References Cited

U.S. PATENT DOCUMENTS

| | | | |
|---|---|---|---|
| 3,527,984 A | 9/1970 | Flanagan et al. | |
| 3,527,985 A * | 9/1970 | Brown | H02H 9/008 361/55 |
| 3,571,608 A | 3/1971 | Hurd, III | |
| 3,684,924 A | 8/1972 | Miller, Jr. | |
| 3,813,578 A * | 5/1974 | Tiffany | H02H 9/008 361/88 |
| 3,845,356 A | 10/1974 | Bullard et al. | |
| 3,997,733 A | 12/1976 | Sanders | |
| 4,099,216 A | 7/1978 | Weberg | |
| 4,438,473 A | 3/1984 | Cawley et al. | |
| 4,860,151 A | 8/1989 | Hutcheon et al. | |
| 4,957,060 A | 9/1990 | Cann | |
| 4,979,067 A | 12/1990 | Foley | |
| 5,144,517 A | 9/1992 | Wieth | |
| 5,835,534 A | 11/1998 | Kogure | |
| 6,397,322 B1 | 5/2002 | Voss | |
| 6,611,208 B1 | 8/2003 | Ketler | |
| 7,463,470 B2 | 12/2008 | Lark | |
| 7,852,610 B2 | 12/2010 | Uhlenberg et al. | |
| 8,848,332 B2 | 9/2014 | Schmidt | |
| 9,407,086 B2 | 8/2016 | Veil et al. | |
| 9,755,416 B2 * | 9/2017 | Kancel | H02H 1/04 |

(Continued)

*Primary Examiner* — Yusef A Ahmed
*Assistant Examiner* — Shahzeb K Ahmad
(74) *Attorney, Agent, or Firm* — Kinney & Lange, P.A.

(57) ABSTRACT

Apparatus and associated methods relate to providing safe electrical power to electrical equipment operating in a hazardous location. Safe electrical power is power that is both current limited and voltage limited so as to provide insufficient energy to ignite flammable gas or dust of a hazardous location. Safe electrical power is provided by first limiting voltage of operating power provided by a power source. Then the voltage-limited operating power is current limited by a current-limiting device. The current and voltage limited operating power is then converted to a step-down power via a current-limiting network. The step-down power is then voltage limited by a second voltage-limiting device. In some embodiments, the current-limiting network is a current mode step-down regulator.

22 Claims, 6 Drawing Sheets

(56) References Cited

U.S. PATENT DOCUMENTS

| | | | |
|---|---|---|---|
| 2012/0200967 A1* | 8/2012 | Mikolajczak | H02H 3/20 361/79 |
| 2013/0155564 A1* | 6/2013 | Schmidt | H02H 9/008 361/93.9 |
| 2017/0063074 A1* | 3/2017 | Yasusaka | H01L 27/0255 |

* cited by examiner

TRAPEZOIDAL POWER-SUPPLY BARRIER BETWEEN HAZARDOUS AND NORMAL LOCATIONS

BACKGROUND

Some industries require work to be performed in hazardous locations that have atmospheres containing dangerous concentrations of flammable gases or dust. For example, such hazardous locations can be found in industrial locations where industrial paint and fluid handling systems are used. Such flammable gases and dust can be ignited by providing heat or electrical sparks sufficient to ignite the explosive atmospheres.

The International Electrotechnical Commission (IEC) is an international organization that has promulgated various standards of safety for conducting operations in such hazardous locations. Three such standards are IEC 60079-0, IEC 60079-11 and IEC 60079-25, which are hereby incorporated by reference. Hazardous locations are defined by the IEC as "hazardous areas". A hazardous area is an "area in which an explosive atmosphere is present, or may be expected to be present, in quantities such as to require special precautions for the construction, installation and use of electrical apparatus." (See e.g., IEC 60079-0, definition 3.2). An explosive atmosphere is a "mixture with air, under atmospheric conditions, of flammable substances in the form of gas, vapour, dust, fibres, or flyings which, after ignition, permits self-sustaining propagation." (See e.g., IEC 60079-0, definition 3.30).

Electrical equipment that is operated at such hazardous locations can present such risks of ignition of the flammable gases or dust. Various methods can be used to guard against ignition of such explosive atmospheres. These include using explosive-proof chambers, immersion of electrical equipment is oil or sand, safe design of electrical equipment, and others. Safe design of such electrical equipment to guard against these risks is termed Intrinsic Safety (IS). Electrical equipment designed with Intrinsic Safety (IS) considerations limit the energy, electrical and thermal, available for ignition of the explosive atmospheres. Intrinsic safety is defined as a "type of protection based on the restriction of electrical energy within equipment and of interconnecting wiring exposed to the explosive atmosphere to a level below that which can cause ignition by either sparking or heating effects." (See e.g., IEC 60079-11, definition 3.1.1).

In normal operation, some electrical equipment can create electric arcs, for example, in switches, motor brushes, connectors, and in other places. Electrical equipment also can generate heat, which in some circumstances can become an ignition source. Even if equipment, in normal operation, doesn't generate ignition sources, various component failures can render such equipment as having the potential to produce such ignition sources. For example, if a component fails in a short-circuit or an open-circuit manner, circuitry that was previously incapable of producing an ignition source can become capable of producing such a source.

A device termed intrinsically safe is designed to be incapable of producing heat or spark sufficient to ignite an explosive atmosphere, even if the device has experienced one or more component failures. Intrinsically safe electrical devices are designed to operate with low voltage and current, and are designed without any large capacitors or inductors that could discharge a spark. Even if a device is intrinsically safe, however, such devices are capable of producing sources of ignition if the power provided to the intrinsically safe electrical device is excessive.

Thus, power-supply barriers are designed that operate in normal locations and provide safe electrical power to devices in hazardous locations. Normal locations are defined by the IEC as "non-hazardous areas." A non-hazardous area is an "area in which an explosive atmosphere is not expected to be present in quantities such as to require special precautions for the construction, installation and use of electrical apparatus." (See e.g., IEC 60079-0, definition 3.3). Safe electrical power is power is achieved by ensuring that only low voltages and currents that are present in such hazardous locations, and that no significant energy storage is possible. One of the most common methods for providing safe electrical power is to limit electric current by using series resistors, and limiting the voltage with Zener diodes.

SUMMARY

Apparatus and associated methods related to a power-supply barrier for providing safe electrical power to electrical equipment in a hazardous location. The power-supply barrier includes first and second voltage-limiting devices, a resistor and a current-limiting network. The first voltage-limiting device is configured to receive operating power and to limit voltage of the received operating power to a first voltage limit. The resistor has an electrical resistance between first and second terminals. The first terminal is coupled to the first voltage-limiting device so as to receive the operating power limited to the first voltage limit. The current-limiting network has input and output terminals. The input terminal is coupled to the second terminal of the resistor so as to receive the operating power provided therethrough and current limited thereby. The output terminal provides step-down power based on a feedback signal. The second voltage-limiting device is configured to receive the provided step-down power from the current-limiting network and to limit the voltage of the provided step-down power to a second voltage less than the first voltage. The feedback signal is the provided step-down power limited to the second voltage.

Some embodiments relate to a method for providing safe electrical power to electrical equipment in a hazardous location. The method begins by receiving, by a first voltage-limiting device, operating power. Then the method continues by limiting, by the first voltage-limiting device, voltage of the operating power to a first voltage limit. The method then continues by receiving, by a resistor having an electrical resistance, the operating power voltage-limited by the first voltage-limiting device. The method continues by limiting, by a resistor having an electrical resistance, current of the voltage-limited operating power to a current limit. The method continues by receiving, by a current-limiting network, the operating power voltage voltage-limited by the first voltage-limiting device and current-limited by the resistor. The method continues by providing, by the current-limiting network, step-down power based on a feedback signal. The method continues by receiving, by second voltage-limiting device, the step-down power. The method continues by limiting, by the first voltage-limiting device, voltage of the step-down power to a second voltage limit. The method concludes by providing, by an output port, the voltage-limited step-down power. The feedback signal is the provided step-down power limited to the second voltage limit.

DETAILED DESCRIPTION

Figure 1:
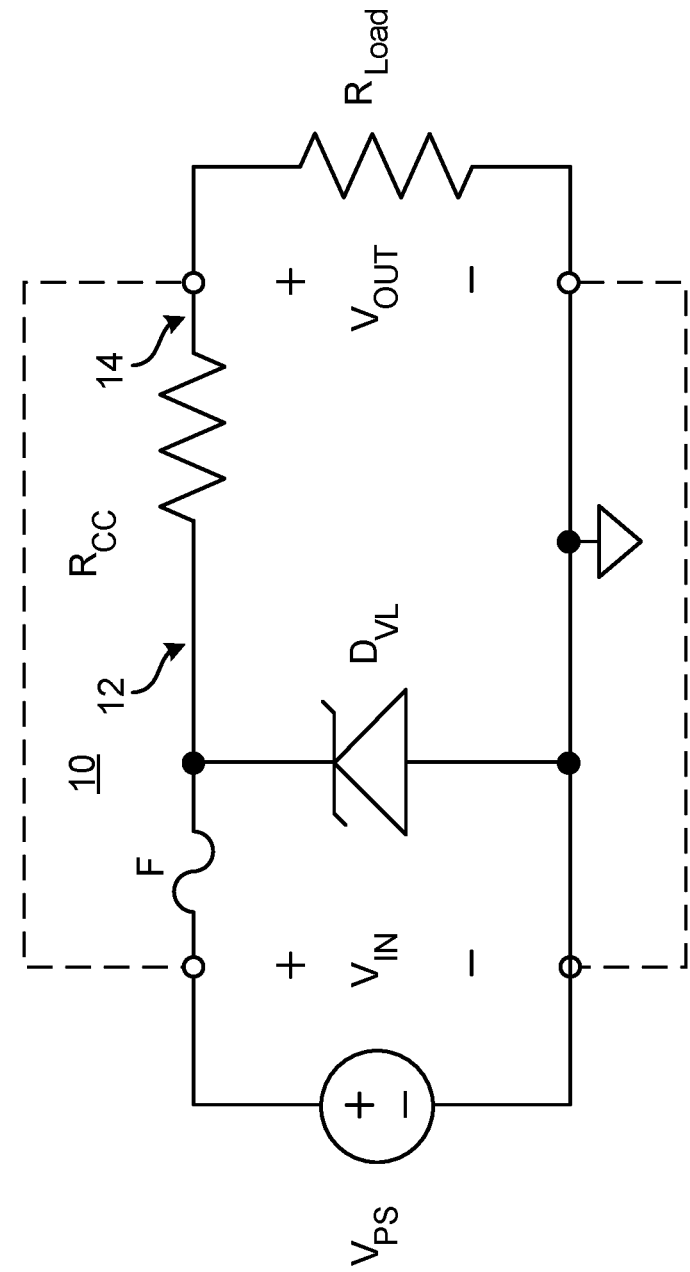
FIG. 1 is a schematic diagram of a prior-art power-supply barrier for providing safe electrical power to a hazardous location.

Apparatus and associated methods relate to providing safe electrical power to electrical equipment operating in a hazardous location. Safe electrical power is power that is both current limited and voltage limited so as to provide insufficient energy to ignite flammable gas or dust of a hazardous location. Safe electrical power is provided by first limiting voltage of operating power provided by a power source. Then the voltage-limited operating power is current limited by a current-limiting device. The current and voltage limited operating power is then converted to a step-down power via a power converter. The step-down power is then voltage limited by a second voltage-limiting device. In some embodiments, the power converter is a current mode step-down regulator. Such apparatus and methods can be configured for use in industrial finishing applications FIG. 1 is a schematic diagram of a prior-art power-supply barrier for providing safe electrical power to a hazardous location. In FIG. 1, prior-art power-supply barrier 10 receives operating power from power source $V_{PS}$ and provides power to load $R_{LOAD}$. Power-supply barrier 10 includes input port $V_{IN}$, output port $V_{OUT}$, fuse F, Zener diode $D_{VL}$ and resistor $R_{CL}$. Power source $V_{PS}$ provides operating power at a controlled voltage level to input port $V_{IN}$ of power-supply barrier 10. Zener diode $D_{VL}$ is electrically coupled to input port $V_{IN}$ via fuse F so as to receive the provided operating power and to limit voltage of the received operating power to a voltage limit determined by breakdown characteristics of Zener diode $D_{VL}$.

Resistor $R_{CL}$ has first terminal 12 electrically coupled to Zener diode $D_{VL}$. Resistor $R_{CL}$ receives the operating power from power source $V_{PS}$ via input port $V_{IN}$. The operating power received by resistor $R_{CL}$ is voltage limited by Zener diode $D_{VL}$. Resistor $R_{CL}$ has second terminal 14 electrically coupled to output port $V_{OUT}$. Resistor $R_{CL}$ presents electrical resistance between first and second terminals 12 and 14. Load $R_{LOAD}$ is electrically coupled to output node $V_{OUT}$. Power delivered through power-supply barrier 10 to load $R_{LOAD}$ is current limited by both resistor $R_{CL}$ and load $R_{LOAD}$.

Power-supply barrier 10 serves the functions of limiting both the voltage delivered across load $R_{LOAD}$ and the current conducted by load $R_{LOAD}$. Zener diode, is configured to limit voltage across load $R_{LOAD}$, thereby functioning as a voltage-limiting device. For example, if Zener diode $D_{VL}$ has a Zener breakdown voltage of 16 volts, then the maximum voltage delivered across $R_{LOAD}$ will be 16 volts, which will happen only if the electrical resistance of load $R_{LOAD}$ is large. If the electrical resistance of Resistor $R_{CL}$ is 32 Ohms, for example, then the Zener diode will begin conducting current when load $R_{LOAD}$ is greater than or equal to 64 Ohms. In other embodiments, other devices and/or circuitry can be used to function as a voltage-limiting device or network.

Resistor $R_{CL}$ is configured to limit current conducted by load $R_{LOAD}$, thereby functioning as a current-limiting device. Using the above exemplary values for Zener breakdown voltage and resistance of Resistor $R_{CL}$, the maximum current conducted by load $R_{LOAD}$ will be 500 mA, which will happen only if the electrical resistance of $R_{LOAD}$ is zero (i.e., load $R_{LOAD}$ is a short circuit). In other embodiments, other devices and/or circuitry can be used to function as a current-limiting device or network.

Figure 2A:
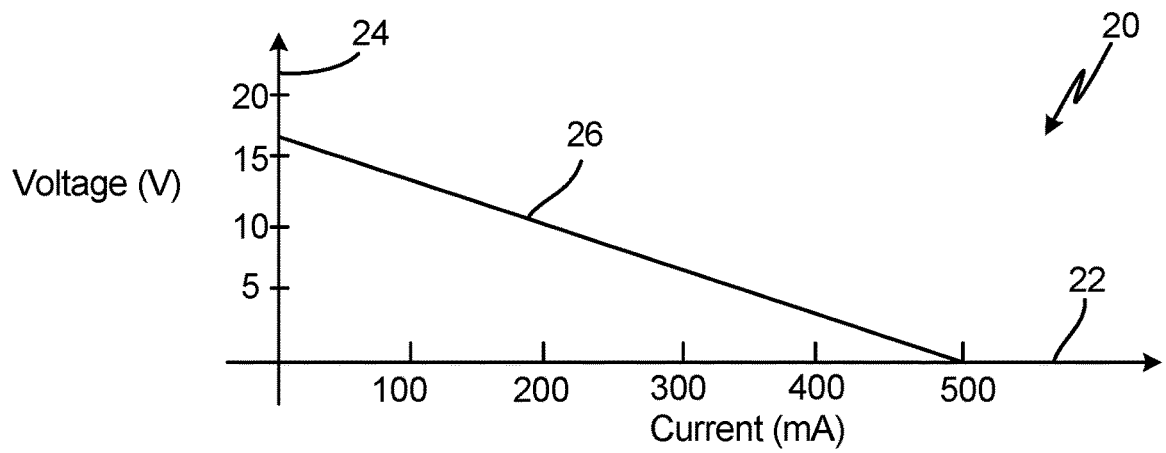
FIGS. 2A-2C are graphs depicting electrical parameters of the prior-art power-supply barrier depicted in FIG. 1 as function of load current.
Figure 2B:
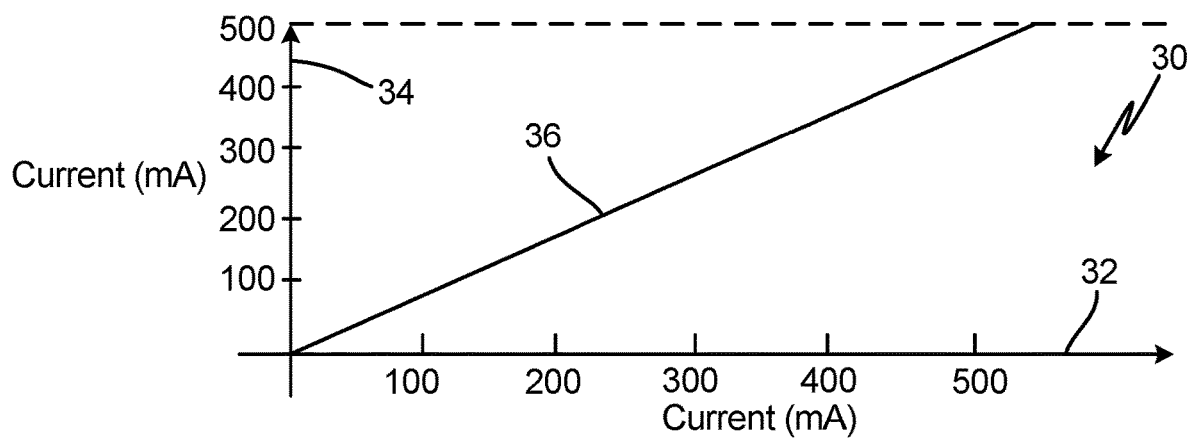
Figure 2C:
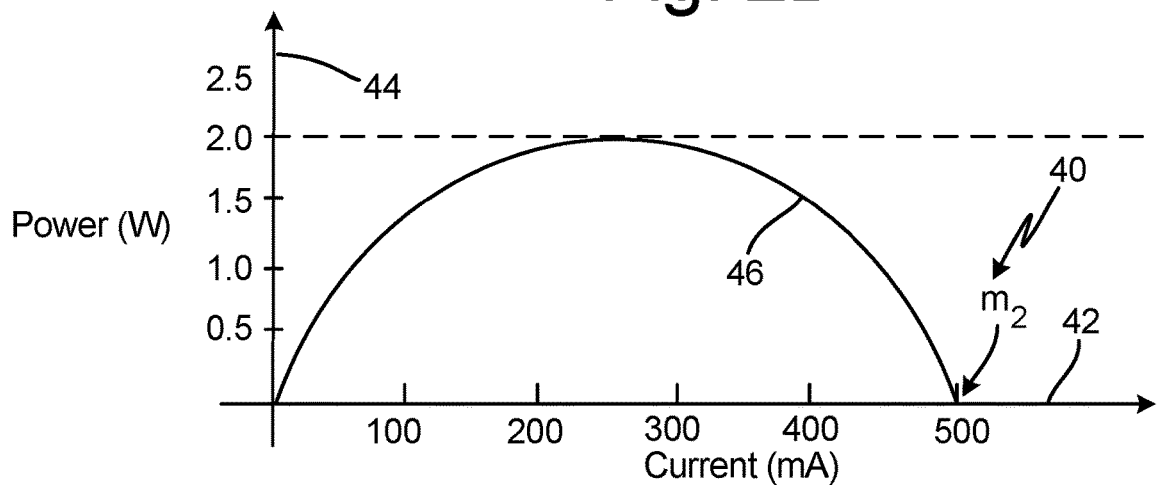

FIGS. 2A-2C are graphs depicting electrical parameters of the prior-art power-supply barrier depicted in FIG. 1 as function of load current. In FIG. 2A, graph 20 includes horizontal axis 22, vertical axis 24 and voltage/current relation 26. Horizontal axis 22 is indicative of electrical current conducted by load $R_{LOAD}$ (depicted in FIG. 1) as measured in milli-Amps (mA). Vertical axis 24 is indicative of voltage measured in Volts (V). Voltage/Current relation 26 is indicative of the voltage across load $R_{LOAD}$ as a function of current conducted by load $R_{LOAD}$. Voltage/Current relation 26 linearly decreases from a maximum voltage of 16 V to a minimum voltage of 0 V as current conducted by load $R_{LOAD}$ increases from 0 mA to 500 mA. The maximum voltage of 16 Volts is obtained when the electrical resistance of load $R_{LOAD}$ is an open circuit (i.e., the electrical resistance of load $R_{LOAD}$ is infinite). The minimum voltage of 0 Volts is obtained when the electrical resistance of load $R_{LOAD}$ is a short circuit (i.e., the electrical resistance of load $R_{LOAD}$ is zero).

In FIG. 2B, graph 30 includes horizontal axis 32, vertical axis 34 and current/current relation 36. Horizontal axis 32 again is indicative of electrical current conducted by load $R_{LOAD}$ as measured in milli-Amps (mA). Vertical axis 34 is indicative of electrical current measured in milli-Amps (mA). Current/Current relation 36 is indicative of the electrical current supplied by power-supply barrier 10 (depicted in FIG. 1) to load $R_{LOAD}$ as a function of electrical current conducted by load $R_{LOAD}$. Current/Current relation 36 represents a direct equality between the electrical current supplied by power-supply barrier 10 and the electrical current delivered to load $R_{LOAD}$, as all of the electrical current supplied is delivered thereto. The minimum electrical current supplied by power-supply barrier 10 to $R_{LOAD}$ of 0 mA is obtained when the electrical resistance of load $R_{LOAD}$ is an open circuit (i.e., the electrical resistance of load $R_{LOAD}$ is infinite). The maximum electrical current supplied by power-supply barrier 10 to $R_{LOAD}$ of 500 mA is obtained when the electrical resistance of load $R_{LOAD}$ is a short circuit (i.e., the electrical resistance of load $R_{LOAD}$ is zero).

In FIG. 2C, graph 40 includes horizontal axis 42, vertical axis 44 and power/current relation 46. Horizontal axis 42 again is indicative of electrical current conducted by load $R_{LOAD}$ as measured in milli-Amps (mA). Vertical axis 44 is indicative of electrical power measured in Watts (W). Power/Current relation 46 is indicative of the electrical power supplied by power-supply barrier 10 (depicted in FIG. 1) to load $R_{LOAD}$ as a function of electrical current conducted by load $R_{LOAD}$. Power/Current relation 46 has power maximum M and power minima $m_1$ and $m_2$. Power minima m1 and m2 supplied by power-supply barrier 10 to $R_{LOAD}$ of 0 W is obtained when the resistance of load $R_{LOAD}$ is either an open circuit (i.e., the resistance of load $R_{LOAD}$ is infinite) or a short circuit (i.e., the resistance of load $R_{LOAD}$ is zero). Power maximum M supplied by power-supply barrier 10 to $R_{LOAD}$ of 2.0 W is obtained when the current conducted by load $R_{LOAD}$ is 250 mA, which occurs when resistance of load $R_{LOAD}$ is 32 Ohms.

Figure 3:
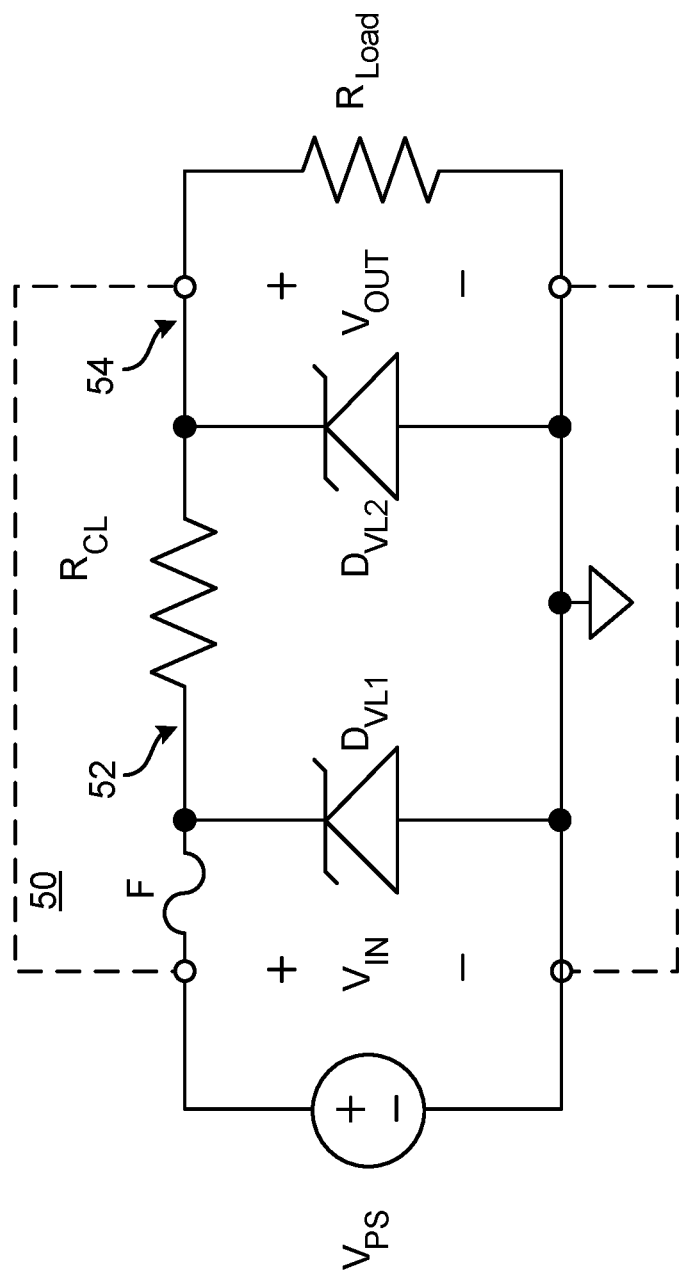
FIG. 3 is a schematic diagram of a trapezoidal power-supply barrier for providing safe electrical power to a hazardous location.

FIG. 3 is a schematic diagram of a trapezoidal power-supply barrier for providing safe electrical power to a hazardous location. In FIG. 3, trapezoidal power-supply barrier 50 receives operating power from power source $V_{PS}$ and provides power to load $R_{LOAD}$. Trapezoidal power-supply barrier 50 is called thus because it exhibits trapezoidal characteristics. Specifically, the load line or Voltage/Current relation as will be shown below with reference to FIG. 4A has a trapezoidal shape. Trapezoidal power-supply barrier 50 includes input port $V_{IN}$, output port $V_{OUT}$, fuse F, Zener diodes $D_{VL1}$ and $D_{VL2}$ and resistor $R_{CL}$. Power source $V_{PS}$ provides operating power at a controlled voltage level to input port $V_{IN}$ of trapezoidal power-supply barrier 50. Zener diode $D_{VL1}$ is electrically coupled to input port $V_{IN}$ via fuse F so as to receive the provided operating power and to limit voltage of the received operating power to a voltage limit determined by breakdown characteristics of Zener diode $D_{VL1}$.

Resistor $R_{CL}$, has first terminal 52 electrically coupled to Zener diode $D_{VL1}$. Resistor $R_{CL}$, receives the operating power from power source $V_{PS}$ via input port $V_{IN}$. The operating power received by resistor $R_{CL}$, is voltage limited by Zener diode $D_{VL1}$. Resistor $R_{CL}$ has second terminal 54 electrically coupled to output port $V_{OUT}$. Resistor $R_{CL}$, presents electrical resistance between first and second terminals 52 and 54. Zener diode $D_{VL2}$ is electrically coupled to second terminal 54 of resistor $R_{CL}$, so as to receive power therefrom and to limit voltage of the received power to a voltage limit determined by breakdown characteristics of Zener diode $D_{VL2}$. Zener diode $D_{VL2}$ is electrically coupled to output node $V_{OUT}$. Power delivered through power-supply barrier 50 to load $R_{LOAD}$ is current limited by both resistor $R_{CL}$ and load $R_{LOAD}$.

Trapezoidal power-supply barrier 50 differs from prior-art power-supply barrier 10 in that trapezoidal power-supply barrier 50 includes Zener diode $D_{VL2}$, not present in prior-art power-supply barrier 10. Zener diode $D_{VL1}$ limits voltage delivered to load $R_{LOAD}$, which relieves Zener diode $D_{VL2}$ from such a duty. In conjunction with resistor $R_{CL}$, Zener diode $D_{VL2}$ still serves to limit the maximum current delivered to load $R_{LOAD}$ to V2. Because Zener diode $D_{VL2}$ has been relieved of its duty to limit the voltage presented across load $R_{LOAD}$, the breakdown characteristics of Zener diode $D_{VL2}$ need not be determined by the maximum voltage limitation requirement for the system. The breakdown voltage of Zener diode $D_{VL2}$ can be increased in a commensurate fashion with an increase in resistance of resistor $R_{CL}$. Such commensurate increases can provide increased power delivery to load $R_{LOAD}$, without increasing the maximum current and voltage limits of the system. Therefore, the breakdown voltage of Zener diode $D_{VL2}$ is typically smaller than the breakdown voltage of Zener diode $D_{VL1}$.

For example, if Zener diode $D_{VL2}$ has a Zener breakdown voltage of 16 volts, then the maximum voltage delivered across $R_{LOAD}$ will be 16 volts, which will happen only if the electrical resistance of load $R_{LOAD}$ is zero Ohms. If Zener diode $D_{VL1}$ has a Zener breakdown voltage of 24 volts and the electrical resistance of Resistor $R_{CL}$, is 48 Ohms, for example, then the maximum current conducted by load $R_{LOAD}$ still will be 500 mA, which will happen only if the electrical resistance of $R_{LOAD}$ is infinite (i.e., load $R_{LOAD}$ is an open circuit).

The maximum power that can be delivered to load $R_{LOAD}$ will increase from 2.0 Watts of the prior-art power-supply barrier to 3.0 Watts, as will be shown below. When resistance of load $R_{LOAD}$ is small, only a small voltage is developed across load $R_{LOAD}$. When such a voltage across load $R_{LOAD}$ is less than the breakdown voltage of Zener diode $D_{VL2}$, then Zener diode $D_{VL2}$ will conduct no current, and is effectively not performing any function in the circuit (e.g., one could remove Zener diode $D_{VL2}$ without any electrical effects). When resistance of load $R_{LOAD}$ equals a critical resistance $R_{CRIT}$ the voltage developed across load $R_{LOAD}$ will be exactly equal to the breakdown voltage of Zener diode $D_{VL2}$, thereby returning voltage-limiting function thereto:

$$R_{CRIT} = \frac{V_2}{V_1 - V_2} R_{CL} \qquad (1)$$

Similarly, critical voltage $V_{CRIT}$ across and critical current $I_{CRIT}$ conducted by load $R_{LOAD}$ are determined:

$$V_{CRIT} = V_2 \qquad (2)$$

$$I_{CRIT} = \frac{V_1 - V_2}{R_{CL}} \qquad (3)$$

Figure 4A:
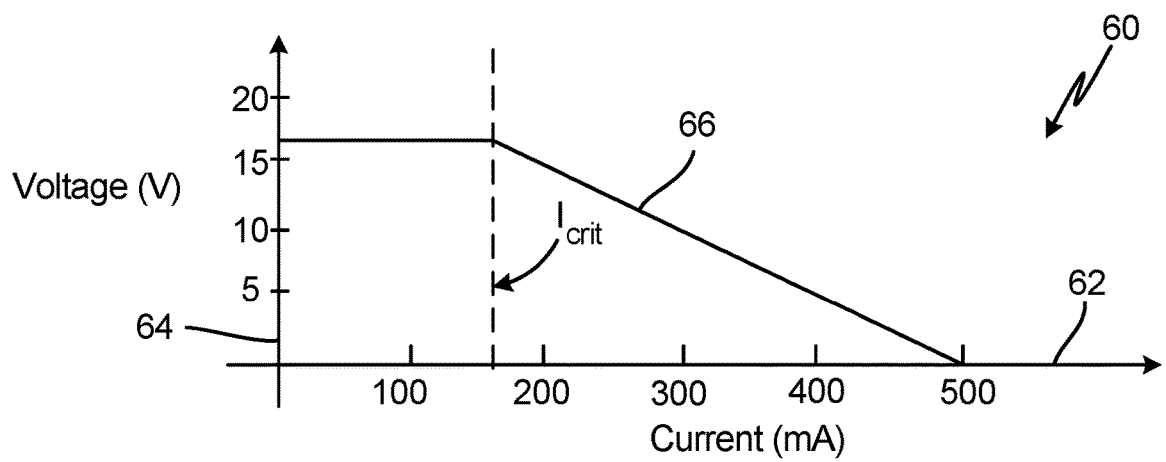
FIGS. 4A-4C are graphs depicting electrical parameters of the trapezoidal power-supply barrier depicted in FIG. 3 as function of load current.
Figure 4B:
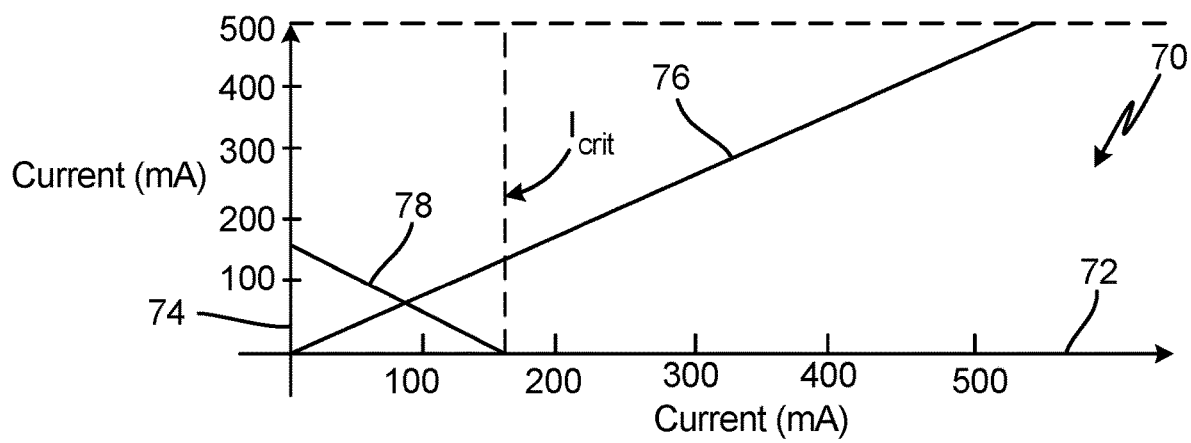
Figure 4C:
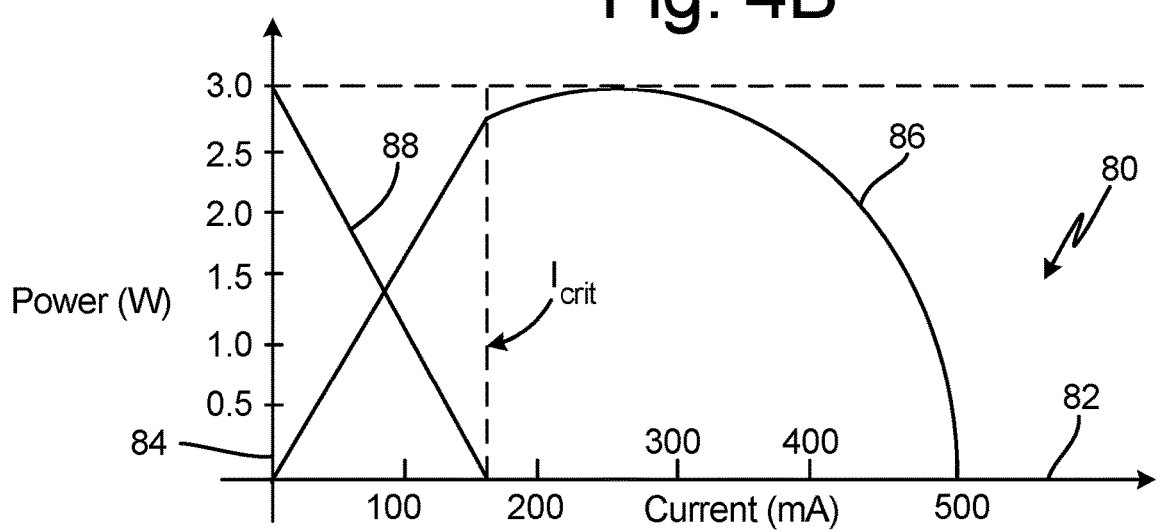

FIGS. 4A-4C are graphs depicting electrical parameters of the trapezoidal power-supply barrier depicted in FIG. 3 as function of load current. Each of the graphs depicted in FIGS. 4A-4C have two regions R1 and R2 separated at critical current $I_{CRIT}$. In FIG. 4A, graph 60 includes horizontal axis 62, vertical axis 64 and voltage/current relation 66. Horizontal axis 62 is indicative of electrical current conducted by load $R_{LOAD}$ (depicted in FIG. 3) as measured in milli-Amps (mA). Vertical axis 64 is indicative of voltage measured in Volts (V). Voltage/Current relation 66 is indicative of the voltage across load $R_{LOAD}$ as a function of current conducted by load $R_{LOAD}$. Voltage/Current relation 66 is constant in region R1 because in region R1 electrical resistance of load $R_{LOAD}$ is relatively large, permitting the voltage thereacross to remain at the value limited by Zener diode $D_{VL2}$. Voltage/Current relation 66 linearly decreases in region R2 from a maximum voltage of 16 V to a minimum voltage of 0 V as current conducted by load $R_{LOAD}$ increases from 0 mA to 500 mA. The maximum voltage of 16 Volts is obtained when the electrical resistance of load $R_{LOAD}$ is equal to critical resistance $R_{CRIT}$ (e.g., $R_{CRIT}$–96 Ohms in the depicted graph). The minimum voltage of 0 Volts is obtained when the electrical resistance of load $R_{LOAD}$ is a short circuit (i.e., the electrical resistance of load $R_{LOAD}$ is zero). The voltage indicated by voltage/current relations 66 is greater than or equal to the voltage indicated by voltage/current relation 26 depicted in FIG. 2B throughout the load current domain.

In FIG. 4B, graph 70 includes horizontal axis 72, vertical axis 74, current/current relation 76, and current/current relation 78. Horizontal axis 72 again is indicative of electrical current conducted by load $R_{LOAD}$ as measured in milli-Amps (mA). Vertical axis 74 is indicative of electrical current measured in milli-Amps (mA). Current/Current relation 76 is indicative of the electrical current supplied by power-supply barrier 50 (depicted in FIG. 3) to load $R_{LOAD}$ as a function of electrical current conducted by load $R_{LOAD}$. Current/Current relation 78 is indicative of the electrical current not supplied to load $R_{LOAD}$, but instead shunted by Zener diode $D_{VL2}$ (depicted in FIG. 3). The total current (i.e., the sum of currents indicated by current/current relations 76 and 78) is greater than or equal to the current indicated by current/current relation 36 in FIG. 2B throughout the load current domain.

In FIG. 4C, graph 80 includes horizontal axis 82, vertical axis 84, power/current relation 86, and power/current relation 88. Horizontal axis 82 again is indicative of electrical current conducted by load $R_{LOAD}$ as measured in milli-Amps (mA). Vertical axis 84 is indicative of electrical power measured in Watts (W). Power/Current relation 86 is indicative of the electrical power supplied by power-supply barrier 50 (depicted in FIG. 3) to load $R_{LOAD}$ as a function of electrical current conducted by load $R_{LOAD}$. Power/Current relation 88 is indicative of power dissipated in Zener diode $D_{VL2}$. Power/Current relation 86 linearly increases in region R1 and has a concave-down quadratic relation in region R2.

Power/Current relation 86 has power maximum M and power minima $m_1$ and $m_2$. Power minima m1 and m2 supplied by power-supply barrier 50 to $R_{LOAD}$ of 0 W is obtained when the resistance of load $R_{LOAD}$ is either an open circuit (i.e., the resistance of load $R_{LOAD}$ is infinite) or a short circuit (i.e., the resistance of load $R_{LOAD}$ is zero). Power maximum M supplied by power-supply barrier 50 to $R_{LOAD}$ of 3.0 W is obtained when the current conducted by load $R_{LOAD}$ is 250 mA, which occurs when resistance of load $R_{LOAD}$ is 48 Ohms. The power indicated by power/current relations 86 is greater than or equal to the power indicated by voltage/current relation 46 depicted in FIG. 2C throughout the load current domain. Although more power can be delivered by trapezoidal power-supply barrier 50 as depicted in FIG. 3, than can be delivered by prior-art power-supply barrier 10 depicted in FIG. 1, the same voltage and current limits are in effect in both power-supply barriers.

Figure 5:
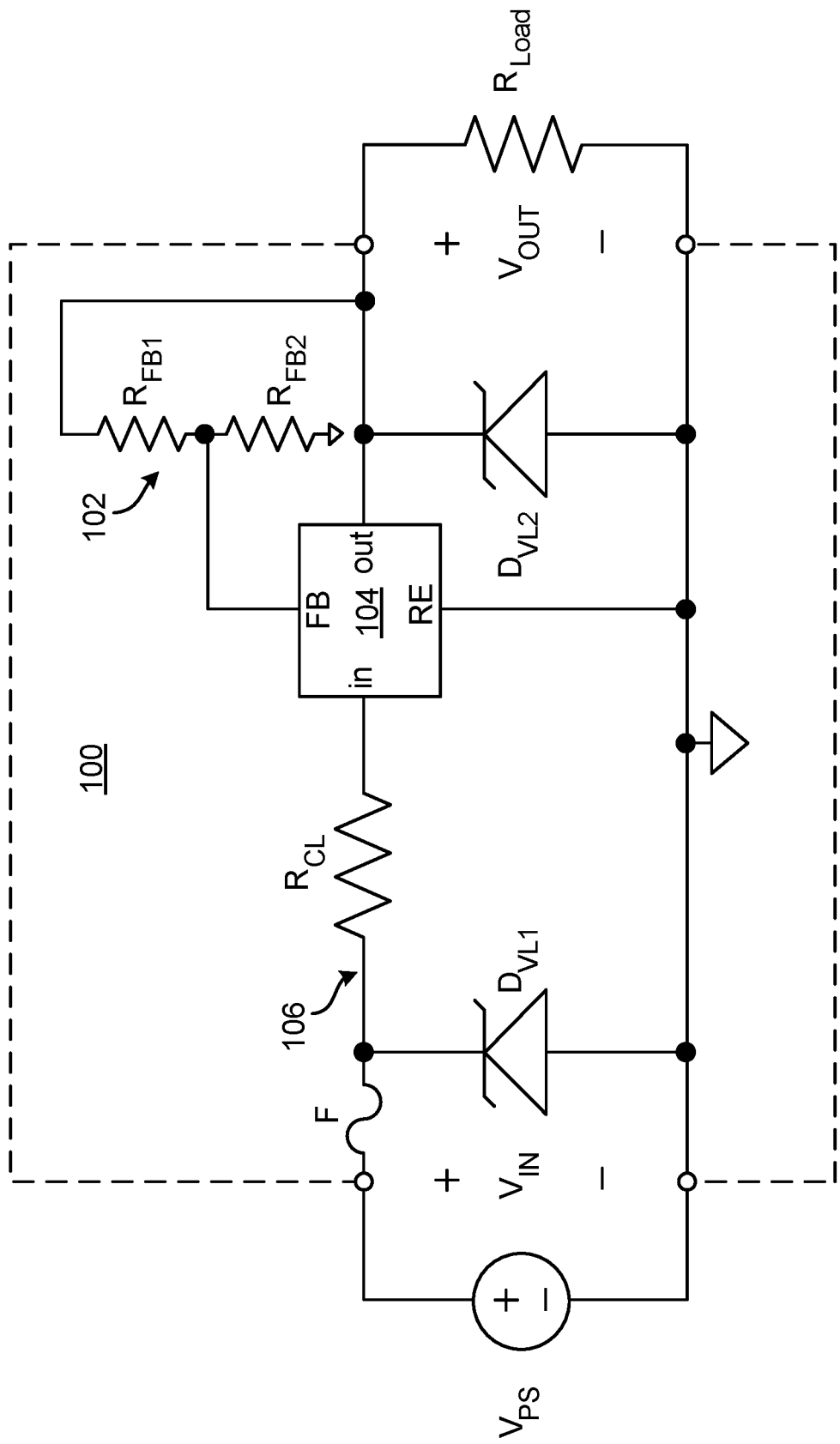
FIG. 5 is a schematic diagram of a trapezoidal power-supply barrier with feedback that uses a power converter to efficiently provide safe electrical power to a hazardous location.

FIG. 5 is a schematic diagram of a trapezoidal power-supply barrier with feedback that uses a power converter to efficiently provide safe electrical power to a hazardous location. In FIG. 5, power-supply barrier 100 receives operating power from power source $V_{PS}$ and provides power to load $R_{LOAD}$. Power-supply barrier 100 includes input port $V_{IN}$, output port $V_{OUT}$, fuse F, Zener diodes $D_{VL1}$ and $D_{VL2}$, resistor $R_{CL}$, feedback network 102, and power converter 104. Power source $V_{PS}$ provides operating power at a controlled voltage level to input port $V_{IN}$ of power-supply barrier 100. Zener diode $D_{VL1}$ is electrically coupled to input port $V_{IN}$ via fuse F so as to receive the provided operating power and to limit voltage of the received operating power to a voltage limit determined by breakdown characteristics of Zener diode $D_{VL1}$.

Resistor $R_{CL}$ has first terminal 106 electrically coupled to Zener diode $D_{VL1}$. Resistor $R_{CL}$ receives the operating power from power source $V_{PS}$ via input port $V_{IN}$. The operating power received by resistor $R_{CL}$ is voltage limited by Zener diode $D_{VL1}$. Resistor $R_{CL}$ has second terminal 108 electrically coupled to input port IN of power converter 104. Resistor $R_{CL}$ presents electrical resistance between first and second terminals 106 and 108. Power converter 104 receives power from second terminal 108 of resistor $R_{CL}$ at input port IN. Power converter 104 converts the received power and provides the converted power to output port OUT of power converter 104. Power converter 104 controls the power provided to output port OUT based on a feedback signal received in feedback port FB.

Zener diode $D_{VL2}$ is electrically coupled to output port OUT of power converter 104, so as to receive power therefrom and to limit voltage of the received power to a voltage limit determined by breakdown characteristics of Zener diode $D_{VL2}$. Zener diode $D_{VL2}$ is electrically coupled to output node $V_{OUT}$. Power delivered through power-supply barrier 100 to load $R_{LOAD}$ is current limited by both resistor $R_{CL}$ and load $R_{LOAD}$. Feedback network 102 includes resistors $R_{FB1}$ and $R_{FB2}$ configured as a voltage divider of the output voltage $V_{OUT}$.

Power-supply barrier 100 differs from trapezoidal power-supply barrier 50 in that power-supply barrier 100 includes power converter 104 and feedback network 102, not present in trapezoidal power-supply barrier 50. Power supply converter 100 is configured to improved efficiency over trapezoidal power converter 50 by reducing the current shunted by Zener diode $D_{VL2}$. Power supply converter 50 can be a DC/DC converter, for example. In some embodiments, power supply converter is a voltage regulator, such as, for example, a current mode step-down regulator.

In some embodiments, power supply converter 50 is configured to control the voltage across $R_{LOAD}$, such that the voltage thereacross is just less than the breakdown voltage of the Zener diode $D_{VL2}$, thereby preventing current conduction therethrough. The power supply converter 50 can be configured to supply such a voltage, when resistance of load $R_{LOAD}$ is greater than the critical value $R_{CRIT}$. When load $R_{LOAD}$ falls below the critical value $R_{CRIT}$, Power-supply barrier 100 is current limited by resistor $R_{CL}$, such that the voltage across $R_{LOAD}$ is reduced from targeted control voltage. Thus, power supply converter 100 and feedback and network 102 can be thought of as a voltage control system, in which voltage is controlled to a target value when resistance of load $R_{LOAD}$ is greater than the critical value $R_{CRIT}$.

Power supply converter 100 and feedback network 102 can also be thought of as an impedance control network. For example, power supply converter 100 is in series with resistor $R_{CL}$, thereby functioning as an effective resistance between Zener diode $D_{VL1}$ and Zener diode $D_{VL2}$. In some embodiments, the effective resistance therebetween is substantially equal to resistor $R_{CL}$ when load $R_{LOAD}$ is less than the critical value $R_{CRIT}$. When load $R_{LOAD}$ is less than the critical value $R_{CRIT}$, effective resistance between input port IN and output port OUT of power supply converter 100 can be a small with respect to resistor $R_{CL}$. For example, effective resistance between input port IN and output port OUT of power supply converter 100 can be less than 20%, 15%, 10%, 5%, or 3% of the resistance of resistor $R_{CL}$.

Figure 6:
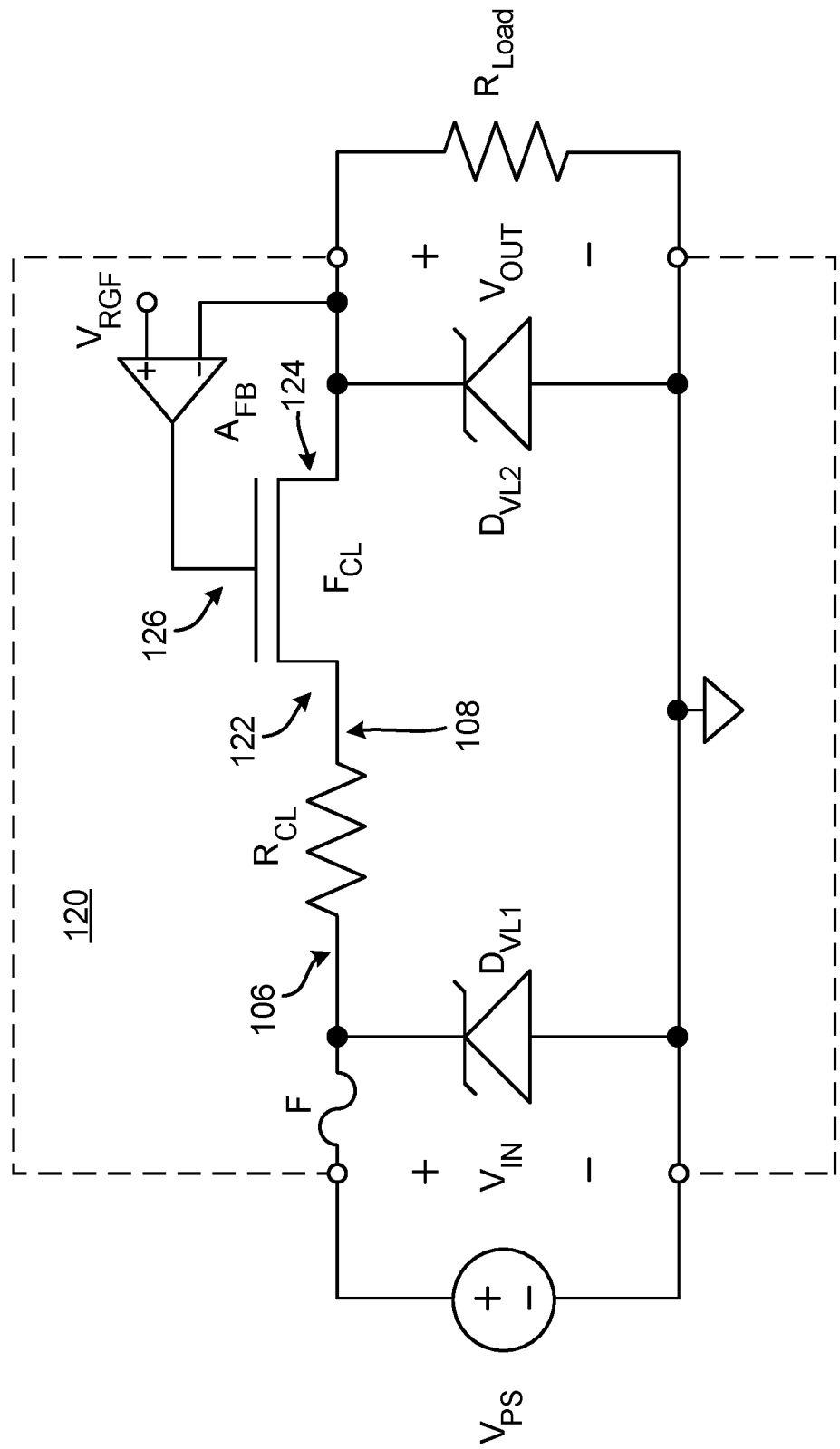
FIG. 6 is a schematic diagram of another embodiment of a trapezoidal power-supply barrier, which uses a transistor in the current-limiting network.

FIG. 6 is a schematic diagram of another embodiment of a trapezoidal power-supply barrier, which uses a transistor in the current-limiting network. In FIG. 5, power-supply barrier 120 receives operating power from power source $V_{PS}$ and provides power to load $R_{LOAD}$. Power-supply barrier 100 includes input port $V_{IN}$, output port $V_{OUT}$, fuse F, Zener diodes $D_{VL1}$ and $D_{VL2}$, resistor $R_{CL}$, feedback amplifier $A_{FB}$, and Field Effect Transistor (FET) $F_{CL}$. Power source $V_{PS}$ provides operating power at a controlled voltage level to input port $V_{IN}$ of power-supply barrier 120. Zener diode $D_{VL1}$ is electrically coupled to input port $V_{IN}$ via fuse F so as to receive the provided operating power and to limit voltage of the received operating power to a voltage limit determined by breakdown characteristics of Zener diode $D_{VL1}$.

Resistor $R_{CL}$ has first terminal 106 electrically coupled to Zener diode $D_{VL1}$. Resistor $R_{CL}$ receives the operating power from power source $V_{PS}$ via input port $V_{IN}$. The operating power received by resistor $R_{CL}$ is voltage limited by Zener diode $D_{VL1}$. Resistor $R_{CL}$ has second terminal 108 electrically coupled to first terminal 122 of current-limiting FET $F_{CL}$. Resistor $R_{CL}$ presents electrical resistance between first and second terminals 106 and 108. Current-limiting FET $F_{CL}$ receives power from second terminal 108 of resistor $R_{CL}$ at first terminal 122. Resistance of current-limiting FET $F_{CL}$ between first terminal 122 and second terminal 124 is controlled by control terminal 126. Resistance of current-limiting FET $F_{CL}$ is controlled by feedback amplifier $A_{FB}$.

Feedback amplifier $A_{FB}$ compares the output voltage at output terminal $V_{OUT}$ with reference voltage $V_{REF}$. In some embodiments, $V_{REF}$ is just less than the breakdown voltage of the Zener diode $D_{VL2}$, thereby preventing current conduction therethrough. In some embodiments, the effective resistance of the current-limiting FET $F_{CL}$ is substantially less than the critical value $R_{CL}$, when $R_{LOAD}$ is less than the critical value $R_{CRIT}$. For example, effective resistance of the current-limiting FET $F_{CL}$ can be less than 20%, 15%, 10%, 5%, or 3% of the resistance of resistor $R_{CL}$. When $R_{LOAD}$ is greater than the critical value $R_{CRIT}$, however, resistance of current-limiting FET $F_{CL}$ increases so as to reduce current flow in Zener diode $D_{VL2}$, thereby improving power efficiency of power-supply barrier 120.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A power-supply barrier for providing safe electrical power to electrical equipment operating in a hazardous location, the power-supply barrier comprising: a first voltage-limiting device configured to receive operating power and to limit voltage of the received operating power to a first voltage limit; a resistor having an electrical resistance between first and second terminals, the first terminal coupled to the first voltage-limiting device so as to receive the operating power limited to the first voltage limit; a current-limiting network having input and output terminals, the input terminal coupled to the second terminal of the resistor so as to receive the operating power provided there through and current limited thereby, the output terminal providing step-down power having an output voltage, the output voltage controlled by the current-limiting network based on a comparison between a reference voltage and a feedback signal; and a second voltage-limiting device configured to receive the provided step-down power from a current-limiting network and to limit the voltage of the provided step-down power to a second voltage limit less than the first voltage limit, wherein the feedback signal is based on the provided step-down power limited to the second voltage, and wherein, the reference voltage is set to be a voltage that is less than the second voltage limit so as to prevent current conduction by the second voltage-limiting device.

2. The power-supply barrier of claim 1, wherein safe electrical power comprises power that is both voltage limited to a predetermined voltage threshold and current limited to a predetermined current threshold.

3. The power-supply barrier of claim 2, wherein the predetermined current threshold is greater than or equal to the first voltage limit divided by a resistance of the resistor.

4. The power-supply barrier of claim 2, wherein the current-limiting network has a current limit that is less than or equal to the predetermined current threshold.

5. The power-supply barrier of claim 2, wherein the second voltage limit is less than or equal to the predetermined voltage limit.

6. The power-supply barrier of claim 1, wherein the current-limiting network is a power converter.

7. The power-supply barrier of claim 6, wherein the power converter is a current mode step-down regulator.

8. The power-supply barrier of claim 1, wherein the first voltage-limiting device comprises a Zener diode having a breakdown voltage equal to the first voltage limit.

9. The power-supply barrier of claim 1, wherein the first voltage-limiting device comprises a plurality of parallel-connected Zener diodes, each having a breakdown voltage equal to the first voltage limit.

10. The power-supply barrier of claim 1, wherein the second voltage-limiting device comprises a Zener diode having a breakdown voltage equal to the second voltage limit.

11. The power-supply barrier of claim 1, wherein the second voltage-limiting device comprises a plurality of parallel-connected Zener diodes, each having a breakdown voltage equal to the second voltage limit.

12. The power-supply barrier of claim 1, further comprising:
a fuse, through which the operating power is conducted.

13. The power-supply barrier of claim 1, further comprising:
a connector in electrical communication with the output terminal thereby providing the safe electrical power to the electrical equipment, when connected thereto.

14. The power-supply barrier of claim 1, wherein the stepped-down power has a voltage less than the first voltage limit.

15. The power-supply barrier of claim 1, wherein the system is configured for use in industrial finishing applications.

16. A plurality of power-supply barriers as recited in claim 1, each further comprising:
a connector in electrical communication with the output terminal thereby providing the safe electrical power to the electrical equipment, when connected thereto.

17. A method for providing safe electrical power to electrical equipment operating in a hazardous location, the method comprising: receiving, by a first voltage-limiting device, operating power; limiting, by the first voltage-limiting device, voltage of the operating power to a first voltage limit; receiving, by a resistor having an electrical resistance, the operating power voltage-limited by the first voltage-limiting device; limiting, by a resistor having an electrical resistance, current of the voltage-limited operating power to a current limit; receiving, by a current-limiting network, the operating power voltage voltage-limited by the first voltage-limiting device and current-limited by the resistor; providing, by the current-limiting network, a step-down power; controlling, via the current-limiting network, an output voltage of the step-down power based on a comparison between a reference voltage and a feedback signal; receiving, by second voltage-limiting device, the step-down power; limiting, by the second voltage-limiting device, voltage of the step-down power to a second voltage limit; and providing, by an output port, the voltage-limited step-down power, wherein the feedback signal is based on the provided step-down power limited to the second voltage, and wherein, the reference voltage is set to be a voltage that is less than the second voltage limit so as to prevent current conduction by the second voltage-limiting device.

18. The method of claim 17, wherein safe electrical power comprises power that is both voltage limited to a predetermined voltage threshold and current limited to a predetermined current threshold.

19. The method of claim 18, wherein the predetermined current threshold is greater than or equal to the first voltage limit divided by a resistance of the resistor.

20. The method of claim 18, wherein the current-limiting network has a current limit that is less than or equal to the predetermined current threshold.

21. The method of claim 18, wherein the second voltage limit is less than or equal to the predetermined voltage limit.

22. The method of claim 17, further comprising:
conducting, via a fuse, the operating power.

* * * * *